May 25, 1943. J. R. STACK 2,319,887
HYDROMETALLURGICAL PROCESS FOR THE RECOVERY OF TIN
Filed June 28, 1940
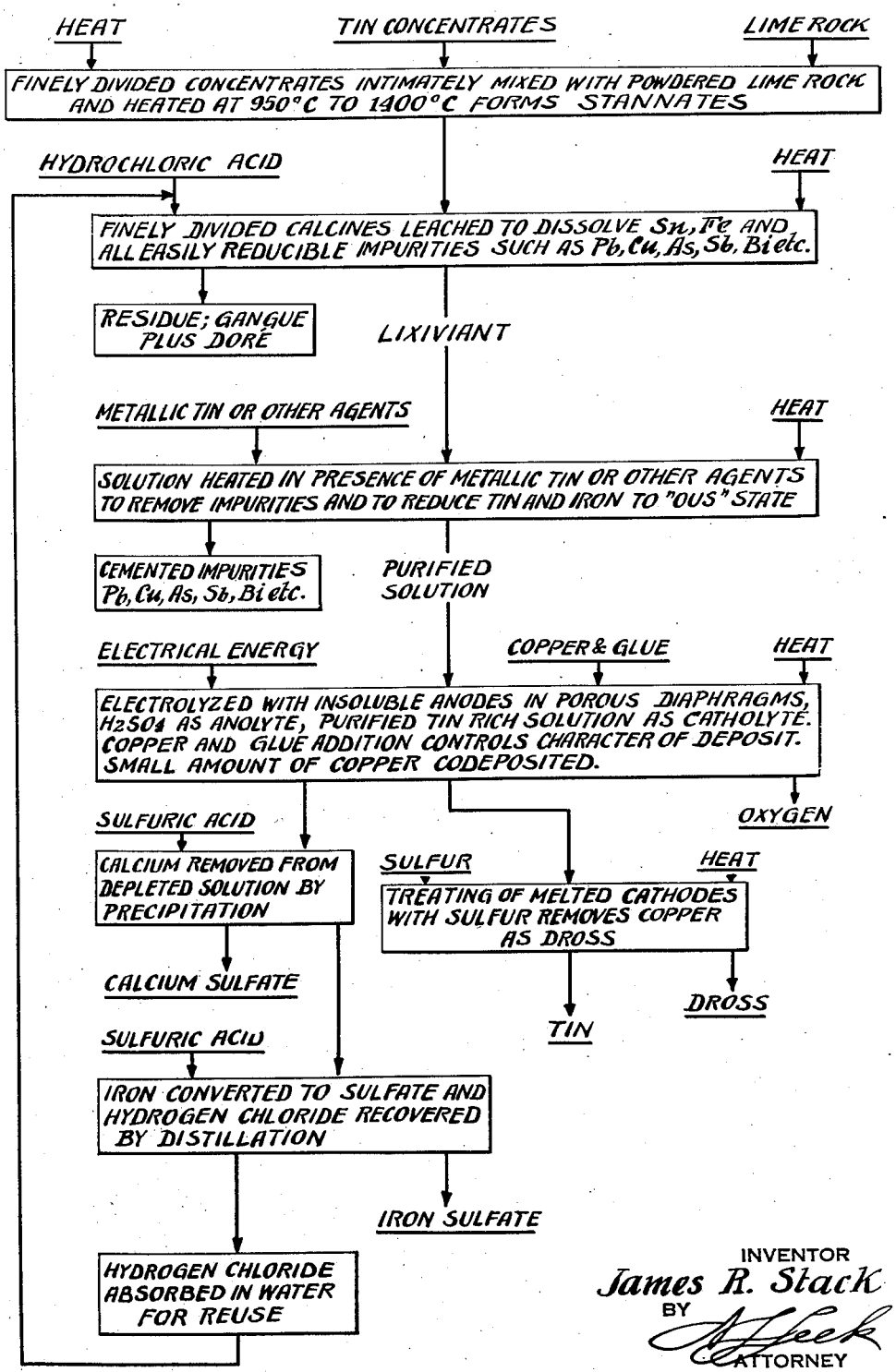
INVENTOR
James R. Stack
BY
ATTORNEY Patented May 25, 1943

2,319,887

UNITED STATES PATENT OFFICE 2,319,887

HYDROMETALLURGICAL PROCESS FOR THE RECOVERY OF TIN

James R. Stack, Pittsburgh, Pa.; Alvilda L. Stack, Montpelier, Vt., executrix of said James R. Stack, deceased Application June 28, 1940, Serial No. 342,957

1 Claim. (Cl. 204—122)

This invention relates to a process for the recovery of tin from ores or concentrates and more particularly to a process for the recovery of tin from ores or concentrates which are normally insoluble such, for example, as stannic oxide ($SnO_2$) or other tin containing substances which may or may not contain iron as an impurity.

On account of the refractory nature and insolubility of tin oxide, it has been the usual practice in the art to reduce the tin oxide in the concentrates by smelting. This reaction is highly endothermic and a unit reverberatory furnace charge requires about twelve hours at approximately 1300° C. Such a process is both time consuming and expensive and for its economic operation requires a pure high grade tin concentrate. Therefore, a hydrometallurgical process in which the tin oxide in lower grade concentrates is converted at a lower temperature and shorter time into a compound from which the tin can be recovered by leaching and electrolysis is very desirable.

It is accordingly an object of the present invention to provide a process suited to the recovery of tin from sources which have heretofore been considered unprofitable, such, for example, as low grade ferruginous tin concentrates.

Another object is to provide a novel and improved process for the efficient and economical recovery of tin from various sources.

Another object is to provide a novel and improved leaching process for recovering tin from sources of the above type.

A further object is to provide a novel and improved method for electrodepositing tin.

Other objects and advantages will be apparent as the nature of the invention is more fully disclosed.

Although the novel features which are believed to be characteristic of this invention are more particularly pointed out in the claim appended hereto, the invention itself may be better understood by referring to the following description in which a specific embodiment thereof has been set forth for purposes of illustration.

The drawing is a flow sheet illustrating, for example, an embodiment of the invention using hydrochloric acid for the lixiviant.

The present process in general comprises five steps—(1) calcining the finely divided tin concentrates with a cheap chemical compound to form a new compound which is readily soluble in certain acids; (2) leaching the calcine in suitable acids to dissolve the tin; (3) purifying the solution by cementation with metallic tin or other agents; (4) subjecting the purified solution to electrolysis to recover the dissolved tin, using an insoluble anode of the porous diaphragm type, and (5) purifying the acid for reuse.

Tin, iron and certain other metals are amphoteric and stannates, ferrates, etc., are formed when oxides of these metals are heated with the oxide, hydroxide, or carbonate of an alkaline earth metal, particularly calcium, barium or strontium. The latter compounds are characterized by being much more soluble in certain acids than the oxides of tin, iron, etc., from which they were formed. This is particularly true of tin. The alkaline earth metals are easily eliminated by precipitation in subsequent operations.

The oxides, hydroxide, and carbonates of these metals are readily available. The cheapest of these reagents to use is calcium carbonate in the form of limestone. The product then formed, in case of tin, is calcium stannate ($CaSnO_3$) and in case of iron, calcium ferrate ($CaFeO_4$) and perhaps some calcium ferrite ($CaFe_2O_3$). These products are readily soluble in certain acids, for example, hydrochloric acid, sulfuric acid, hydrofluoric acid, fluosilicic acid, fluoboric acid and certain organic acids or mixtures of acids.

The temperature at which the calcining is carried out may vary from 950° C. to 1400° C. though somewhat higher temperatures are not harmful. The time of calcination of course varies with the character of the tin concentrates and the temperature used. In general, for a given tin concentrate the lower the temperature the longer the time required for the same degree of conversion. In normal operations I have found that substantially complete conversion of the tin oxide to the soluble stannate form can be accomplished by calcining at a temperature of 1300° C. for a duration of approximately one hour, in any suitable manner such as by the batch method with or without rabbling, or in a continuous process in a mechanical hearth roaster, such as a Wedge or Herreshoff type furnace.

In one embodiment, the finely divided tin ore or concentrates, preferably 100 to 200 mesh, are intimately mixed with powdered lime rock ($CaCO_3$), using a slight excess of the stoichiometric proportions required to combine with the tin, iron and impurities to form calcium stannate, calcium ferrate, etc. If the tin is not present in the ore or concentrates in oxide form, the material may be first roasted to convert the same to oxides. It is advantageous to use a source of lime low in magnesia and alkalies because these impurities may interfere with some of the subsequent steps such as the acid regeneration, to be described.

The mixing may be performed in a ball mill or other device suited to insure intimate mixing. The mixture is then calcined in a suitable furnace, preferably a direct fired mechanical hearth roaster of the Wedge or Herreschoff type above mentioned.

The calcined product may again be pulverized if necessary but, in any event, is in a readily pulverizable condition since the calcine is infusible. It is then dissolved rapidly by leaching with a hot dilute acid, while agitating the material if desired to facilitate the leaching operations. While various acids capable of dissolving calcium stannate and calcium ferrate may be used, I have found hydrochloric acid to be particularly satisfactory.

The residue may be separated by settling, decantation or filtration and thorough washing. It should contain the dore and substantially all of the gangue, such as silica, alumina, etc. The residue may be further worked by conventional methods for recovery of gold and silver. The lixiviant contains substantially all of the tin, iron and other metallic impurities together with a minor portion of the silica.

The lixiviant may be treated by agitating the hot solution in the presence of a suitable reducing agent, such as metallic tin plates, to cement out the easily reducible metallic impurities such as lead, copper, arsenic, antimony, bismuth, etc., and to reduce the stannic tin and ferric iron to the stannous form and ferrous form respectively, from which condition the tin can be deposited. While the reduction and cementation can be effected by metallic tin, other suitable metals, such as iron or nickel or chemical reducing agents may be used either singly or in combination with metallic reduction.

The cemented impurities may be separated by settling and decantation and the solution filtered to remove any suspended solids. The separated impurities may be filter pressed or centrifuged and washed and may be sold to smelters for the metal values such as bismuth, copper, etc.

The purified solution contains essentially $Sn^{++}$, $Ca^{++}$ and $H^+Cl^-$ and may be electrolyzed with insoluble anodes using standard multiple system tanks for the electrolytic cells and electrolytic diaphragms for the anode compartments to prevent the alternate oxidation and reduction of tin at the anode and cathode respectively, which would interfere with the efficiency of depositing tin at the cathode.

The anode proper may consist of a lead electrode surrounded by a porous diaphragm using a dilute solution of sulfuric acid as the anolyte. The purified tin rich solution from which tin is to be recovered may constitute the catholyte. In order to prevent mechanical mixing of the anolyte and catholyte the porous diaphragms may be impregnated with silica jell. While tin is deposited at the cathode, oxygen is liberated at the anode and may be recovered, if desired.

The deposit from a tin chloride solution is very difficult to control even with the use of the so-called addition agents and frequently results in a dendritic, needle-like, crystalline deposit which is non-adherent and tends to cause short circuits. However, I have found that by the controlled addition of a soluble copper compound in the presence of glue, thus codepositing a fraction of a per cent of copper, an adherent deposit of tin can be obtained. The copper and glue may be added separately or as a mixture.

The tin may be deposited on tin starting sheets or on tinned sheet iron. The cathode tin may then be melted and decopperized according to standard practice in tin, lead, and solder refining, for example, by stirring the molten metal in a kettle until a vortex is formed and adding sulphur, which combines with the copper and comes to the surface as a dry dross or matte contaminated with some tin. The copper dross or matte may be removed and roasted to remove sulfur and then leached with acid to dissolve the copper, and the residue of stannic oxide may be returned to the calciner for retreatment or the copper (tin) matte may be sold to smelters. The remaining tin is of a high degree of purity and constitutes the final product of the process.

The tin free hydrochloric acid solution after electrolysis contains calcium and iron as the major impurities which must be eliminated to regenerate the acid.

The calcium may be precipitated almost quantitatively by adding the stoichiometric amount or an excess of sulfuric acid, and the calcium sulfate precipitate may be separated from the solution by thickening and may be washed free of acid by countercurrent decantation in a series of thickeners.

The iron may be separated from the hydrochloric acid in various ways—one method is by distillation, using the waste heat from the calcining furnace and absorbing the hydrogen chloride gas in water to form hydrochloric acid according to standard practice in the manufacture of the acid.

The above description refers to batch operation. When operating as a continuous process only a portion of the solution is treated for the removal of iron; that is a sufficient amount to keep the iron contents balanced at approximately 16 grams per liter. For this purpose the iron may be precipitated by neutralizing with milk of lime or may be crystallized out. In this instance it is only necessary to deposit out all the tin in the portion of the solution from which the iron is to be removed and the balance of the solution can be recirculated as lixiviant.

Other impurities, such as magnesium, zinc, nickel cobalt, tungsten, titanium, etc., may be present in solution and may be removed if desired by special chemical methods. However, the quantities would be small since their occurrence in tin concentrates is rare.

In the above described process hydrochloric acid is used as a leaching agent because of its relative cheapness and availability. It is to be understood, of course, that other leaching agents capable of dissolving the stannate which is formed during the calcining step may be employed. Examples of such agents are sulphuric acid, hydrofluoric acid, fluoboric acid and fluosilicic acid, certain organic acids or mixture of acids. When other acids than hydrochloric are used from which tin can be deposited in adherent form using the conventional addition agents; it is obvious that the addition to the electrolyte of a soluble compound of copper which codeposits with the tin can be omitted.

Calcium carbonate has been referred to as the calcining reagent. However, the other alkaline earth metals may be used and in that case the metal radical will be subsequently removed from the electrolyte by steps similar to those above described. Calcium has been referred to in the specific example only as an illustration.

The present process is particularly applicable to the recovery of tin from relatively low grade tin ores and concentrates in which the tin is of comparatively low concentration and is accompanied by various impurities. In Bolivian concentrates, for example, the impurities may comprise (1) easily reducible materials, such as lead, copper, arsenic, antimony and bismuth; (2) more difficultly reducible materials, such as iron; (3) gangue or slag forming materials, such as silica, alumina, lime, tungsten and titanium and (4) matte forming materials, such as sulphur. Usually these impure materials require some form of treatment before smelting. However, the present process is suited to the direct recovery of the tin values from such raw materials both efficiently and economically and results in a minimum amount of waste. No fume, slag, hard head (a tin-iron alloy) or troublesome by-products are produced. In the calcining step the tin oxide in the concentrates is converted into an acid soluble compound which may be readily dissolved by leaching.

It is to be understood that the tin may be separated from the lixiviant by various chemical methods, if desired, such, for example, as by oxidation, aeration, crystallization and precipitation. The particular form of electrolytic treatment set forth herein, however, has been found to be economical and to materially reduce the cost of tin recovery.

The use of the copper and glue as an addition agent in the electrolysis produces a dense, uniform adherent deposit which may be readily controlled. The electrolysis and the subsequent removal of the small amount of copper which is codeposited constitute an improved and commercially practical method for recovering the tin from the solution. It is to be understood that glue has been referred to as an addition agent for purposes of illustration and that other suitable addition agents may be substituted therefor depending upon the particular acid used.

While a specific embodiment of the invention has been set forth for purposes of illustration, it is to be understood that various changes and modifications may be made therein as will be readily apparent to a person skilled in the art. The invention is only to be limited in accordance with the scope of the following claim.

What is claimed is:

The process for recovering tin from a hydrochloric acid bath containing tin in solution which comprises electrolyzing the bath using insoluble anodes of the porous diaphragm type while adding a soluble copper compound and glue to deposit the tin cathodically together with a small amount, less than 1% of copper, separating the cathodic tin from the copper and recovering the tin.

JAMES R. STACK.